United States Patent
Zhang et al.

(10) Patent No.: US 10,303,135 B2
(45) Date of Patent: May 28, 2019

(54) METHOD AND APPARATUS FOR CONTROLLING SMART HOME DEVICE

(71) Applicant: Xiaomi Inc., Beijing (CN)

(72) Inventors: Pengfei Zhang, Beijing (CN); Yongfeng Xia, Beijing (CN); Yidong Wang, Beijing (CN); Tiejun Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 437 days.

(21) Appl. No.: 14/882,052

(22) Filed: Oct. 13, 2015

(65) Prior Publication Data

US 2016/0154390 A1    Jun. 2, 2016

Related U.S. Application Data

(63) Continuation of application No. PCT/CN2015/077884, filed on Apr. 29, 2015.

(30) Foreign Application Priority Data

Nov. 28, 2014  (CN) ........................... 2014 1 0713632

(51) Int. Cl.
  *G05B 15/02* (2006.01)
  *H04L 12/28* (2006.01)

(52) U.S. Cl.
  CPC ............ *G05B 15/02* (2013.01); *H04L 12/282* (2013.01); *H04L 12/2816* (2013.01); *G05B 2219/40202* (2013.01); *G05B 2219/45098* (2013.01)

(58) Field of Classification Search
  CPC .................................................... G05B 15/02
  See application file for complete search history.

(56) References Cited

U.S. PATENT DOCUMENTS

| 7,346,428 B1* | 3/2008 | Huffman | A47L 11/24 318/568.1 |
| 9,685,071 B1* | 6/2017 | Fu | G08B 29/185 |

(Continued)

FOREIGN PATENT DOCUMENTS

| CN | 101786272 A | 7/2010 |
| CN | 101898354 A | 12/2010 |

(Continued)

OTHER PUBLICATIONS

International Search Report (including English translation) issued in corresponding International Application No. PCT/CN2015/077884, dated Aug. 17, 2015, 6 pages.

(Continued)

*Primary Examiner* — Mamadou L Diallo
(74) *Attorney, Agent, or Firm* — Arch & Lake LLP

(57) ABSTRACT

A method and an apparatus are provided for controlling a smart home device. In the method, the apparatus acquires a target state of the smart home device, where the target state is a state determined according to visitor information within a predetermined range. The smart home device performs an operation corresponding to the target state. The smart home device flexibly performs different operations according to the actual visit situation so that working efficiency is improved. Especially when there are a large number of visitors within the predetermined range, the smart home device may automatically enter an unconventional working state, such that inconvenience caused by movement and noise to the visitors may be prevented, thereby improving overall performance of the smart home device.

14 Claims, 13 Drawing Sheets

(56) References Cited

U.S. PATENT DOCUMENTS

| | | |
|---|---|---|
| 2005/0237188 A1 | 10/2005 | Tani |
| 2007/0027579 A1 | 2/2007 | Suzuki et al. |
| 2007/0216764 A1* | 9/2007 | Kwak ................ G07C 9/00309 348/14.06 |
| 2013/0206177 A1 | 8/2013 | Burlutskiy |
| 2014/0163733 A1* | 6/2014 | Sadowski ............. B25J 19/063 700/255 |
| 2014/0207282 A1 | 7/2014 | Angle et al. |
| 2015/0120598 A1* | 4/2015 | Fadell ................. G06Q 10/083 705/333 |
| 2015/0156031 A1* | 6/2015 | Fadell ................. H04L 12/2816 700/276 |
| 2016/0000282 A1* | 1/2016 | Vanderstegen-Drake .................... A47L 9/009 280/6.157 |
| 2016/0123618 A1* | 5/2016 | Hester .................. F24F 11/006 700/276 |
| 2017/0008174 A1* | 1/2017 | Rosen .................. B25J 9/1697 |
| 2017/0248956 A1* | 8/2017 | Tang ...................... G05D 1/028 |
| 2017/0330439 A1* | 11/2017 | Zhou .................... G08B 21/182 |
| 2017/0346649 A1* | 11/2017 | Zhang ................... H04L 12/282 |

FOREIGN PATENT DOCUMENTS

| | | |
|---|---|---|
| CN | 102490172 A | 6/2012 |
| CN | 103284663 A | 9/2013 |
| CN | 103729585 A | 4/2014 |
| CN | 103792944 A | 5/2014 |
| CN | 104333498 A | 2/2015 |
| JP | 2005151507 A | 6/2005 |
| JP | 2005344952 A | 12/2005 |
| JP | 2011158186 A | 8/2011 |
| JP | 2011247435 A | 12/2011 |
| RU | 2210492 C2 | 8/2003 |
| WO | 2014103161 A1 | 7/2014 |

OTHER PUBLICATIONS

Extended European search report issued in corresponding European Application No. 15193087.2, dated Apr. 20, 2016, 8 pages.

Official Action (including English translation) issued in corresponding Russian Patent Application No. 2015137291/11(057052), dated Oct. 12, 2016, 13 pages.

Notification of Reasons for Refusal (including English translation) issued in corresponding Japanese Patent Application No. 2016-561067, dated Mar. 14, 2017, 7 pages.

First Office Action (including English translation) issued in corresponding Chinese Patent Application No. 201410713632.2, dated Mar. 22, 2017, 28 pages.

Decision to Grant a Patent (including English translation) issued in corresponding Japanese Patent Application No. 2016-561067, dated Oct. 3, 2017, 6 pages.

Second Office Action (including English translation) issued in corresponding Chinese Patent Application No. 201410713632.2, dated Nov. 3, 2017, 23 pages.

\* cited by examiner (Integrated) Image pick-up device

Smart clearing device

METHOD AND APPARATUS FOR CONTROLLING SMART HOME DEVICE

CROSS-REFERENCES TO RELATED APPLICATIONS

This application is a continuation of International Application No. PCT/CN2015/077884 with an international filing date of Apr. 29, 2015, which is based upon and claims priority to Chinese Patent Application No. 201410713632.2, filed on Nov. 28, 2014, the entire contents of which are incorporated herein by reference.

TECHNICAL FIELD

The present disclosure relates to the field of communication technologies, and more particularly, relates to a method and an apparatus for controlling a smart house device.

BACKGROUND

With the development of the science and technology, and the popularity of the Internet, various smart home devices are coming into people's daily life. For example, a sweeping robot can freely move within a specific application range, for example, within home or working place, based on artificial intelligence, thereby to automatically complete the sweeping. However, in the related technologies, due to visitor mobility within the specific application range, if the sweeping robot does the cleaning when there are many visitors, movement of the visitors within the space may hinder the cleaning, and thus the working effectiveness of the sweeping robot is poor. In addition, inconvenience caused by movement and noise generated during the working is brought to the visitors.

SUMMARY

The present disclosure provides a method and an apparatus for controlling a smart home device.

According to a first aspect of embodiments of the present disclosure, a method for controlling a smart home device is provided. The method includes: acquiring a target state of the smart home device, the target state being a state determined according to visitor information within a predetermined range; and performing an operation corresponding to the target state.

According to a second aspect of embodiments of the present disclosure, a method for controlling a smart home device is provided. The method includes: acquiring visitor information within a predetermined range; determining a target state of the smart home device according to the visitor information; and sending a state indication command including the target state to the smart home device, such that the smart home device performs an operation corresponding to the target state according to the state indication command.

According to a third aspect of embodiments of the present disclosure, an apparatus for use in controlling a smart home device is provided. The apparatus includes: a processor; and a memory for storing instructions executable by the processor; wherein the processor is configured to perform: acquiring a target state of the smart home device, the target state being a state determined according to visitor information within a predetermined range; and conducting an operation corresponding to the target state.

According to a fourth aspect of embodiments of the present disclosure, another apparatus for use in controlling a smart home device is provided. The apparatus includes: a processor; and a memory for storing instructions executable by the processor; wherein the processor is configured to perform: acquiring visitor information within a predetermined range; determining a target state of the smart home device according to the visitor information; and sending a state indication command including the target state to the smart home device, such that the smart home device performs an operation corresponding to the target state according to the state indication command.

It shall be appreciated that the above general description and the detailed description hereinafter are only illustrative and interpretative but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the present disclosure is for the purpose of describing particular embodiments only and is not intended to limit the present disclosure. As used in the present disclosure and the appended claims, the singular forms "a", "an" and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms first, second, third, etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to determining" or "in response to detecting" depending on the context.

Figure 1:
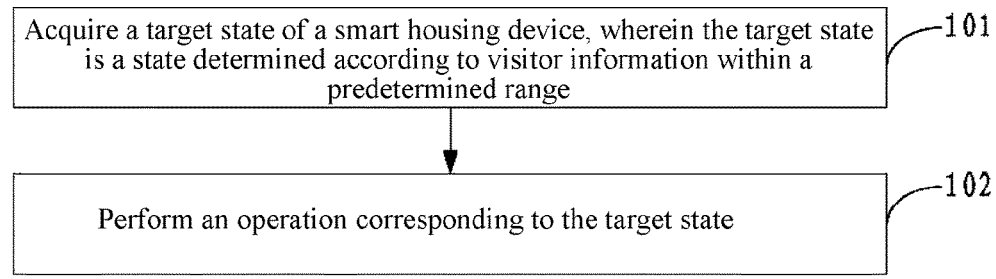
FIG. 1 is a flowchart illustrating a method for controlling a smart home device according to an exemplary embodiment of the present disclosure.

FIG. 1 is a flowchart illustrating a method for controlling a smart home device according to an exemplary embodiment of the present disclosure. The method may be applied in a smart home device, and include the following steps.

In step 101, the smart home device may acquire a target state of the smart home device, where the target state is a state determined according to visitor information within a predetermined range.

In this embodiment, the predetermined range may specifically refer to home, working place or the like. In the predetermined range, a smart router for accessing network is typically deployed, which not only has the traditional routing function, but also may further include an independent operating system and disk, referred to as a router. In the predetermined range, several smart home devices capable of accessing the router may be deployed, for example, smart image pick-up device and the like. The smart home device may be specifically a smart cleaning device capable of moving within the predetermined range, for example, a cleaning robot.

Due to visitor mobility within the predetermined range, according to the embodiments of the present disclosure, the target state of the smart home device is determined according to the visitor information within the predetermined range. In this way, the smart home device may perform an operation corresponding to the target state, to improve the working effectiveness of the smart home device. The smart home device may acquire the target state in any one of the following manners:

First manner: A smart home device acquires visitor information within a predetermined range, and determines a target state of the smart home device according to the visitor information.

The smart home device may establish a communication connection with a router within the predetermined range, and acquire a visitor device list within the predetermined range from the router according to a predetermined time period. The visitor device list includes one or more device identifiers of one or more visitor devices accessing the router. The smart home device compares a first identifier quantity of device identifiers included in a visitor device list acquired within a current time period and a second identifier quantity of device identifiers included in a visitor device list acquired within a previous time period. According to a comparison result, if the second identifier quantity is greater than the first identifier quantity, it is determined that the target state of the smart home device is a working state; and if the second identifier quantity is less than the first identifier quantity, it is determined that the target state of the smart home is a muted state or a stopped state.

Alternatively or additionally, the smart home device may acquire a visitor image within the predetermined range according to a predetermined time period. The visitor image may be picked up by an image pick-up device integrated into the smart home device, or may be picked up by a smart image pick-up device deployed within the predetermined range and then transmitted to the smart home device, or may be picked up by the smart image pick-up device and then forwarded to the smart home device by a router. The smart home device identifies the visitor quantity in the visitor device, and compares a first visitor quantity identified in a visitor image acquired within a current time period with a second visitor quantity identified in a visitor image acquired within a previous time period. According to a comparison result, if the second visitor quantity is greater than the first visitor quantity, it is determined that the target state of the smart home device is a working state; and if the second visitor quantity is less than the first visitor quantity, it is determined that the target state of the smart home device is a muted state or a stopped state.

Alternatively or additionally, the smart home device may also firstly acquire member information within the predetermined range, and then identify visitor information from the member information. When the member information is a member device list maintained on a router, a prestored host device identifier of a host device may be acquired, and then the host device identifier may be deleted from the member device list to acquire a visitor device list formed of one or more visitor device identifiers of one or more visitor devices. When the member information is a member image picked up within the predetermined range, a prestored host image may be acquired, and then the host image may be deleted from the member images by using a face identification algorithm to acquire the visitor images. It should be noted that the above member information may also be acquired according to a predetermined time period. When the member information is a member image, the member image may be picked up by an image pick-up device integrated into the smart home device, or may be picked up by a smart image pick-up device and then transmitted to the smart home device, or may be picked up by the smart image pick-up device and then transmitted to the smart home device by a router, which is not limited in this embodiment.

Second manner: A smart home device receives a state indication command, and acquires a target state of the smart home device from the state indication command.

The smart home device may receive a state indication command sent by a router. The state indication command includes a target state of the smart home device determined by the router according to a visitor device list, or includes a target state of the smart home device determined by the router according to a visitor image picked up by a smart image pick-up device.

Alternatively or additionally, the smart home device may also receive a state indication command sent by the smart image pick-up device. The state indication command includes a target state of the smart home device determined according to the visitor image picked up by the smart image pick-up device.

In step 102, the smart home device may perform an operation corresponding to the target state.

In the embodiments of the present disclosure, when the target state of the smart home device is the working state, the smart home device may work within the predetermined range; when the target state of the smart home device is the muted state, the smart home device may work in a muted manner within the predetermined range; and when the target state of the smart home device is the stopped state, the smart home device stops working.

Using the scenario where the smart home device is a smart cleaning device as an example, when a target state acquired the smart cleaning device is a working state, the smart cleaning device may perform a cleaning operation corresponding to the working state in the following different manners:

First manner: When a smart cleaning device acquires a visitor activity region within a predetermined range, the smart cleaning device may perform a cleaning operation within the activity region. The smart cleaning device may position a visitor-carried device within the predetermined range, and acquire visitor location information. Using the scenario where the visitor-carried device is a smart phone, location information of the smart phone may be acquired via a global positioning system (GPS) module integrated into the smart phone, such that a region determined according to the location information is used as the visitor activity region. For example, with the location coordinates in the location information of each visitor as a circle center and with a predetermined length value as a radius, a circular activity range is predetermined for the visitor, and a region formed of all the circular activity ranges of all the visitors is used as the determined visitor activity region.

Second manner: When a smart cleaning device acquires a visitor activity path within a predetermined range, the smart cleaning device may perform a cleaning operation according to the activity path. The smart cleaning device may position and trace a visitor-carried device within the predetermined range and acquire visitor location change information. The visitor location change information is a set of the location coordinates generated by activities of the visitor within a period of time. The visitor activity path may be determined according to the location change information. For example, according to an order of sequentially acquiring the location coordinates in the location coordinate set, the location coordinates are lined together, and the line formed thereby may be used as the visitor activity path.

The smart home device according to this embodiment may acquire a target state determined according to visitor information within a predetermined range, and perform an operation corresponding to the target state. Since the smart home device may flexibly perform different operations according to the actual visit situation, the working effectiveness may be improved. Here, the actual visit situation may include: the number of visitors, the coordinates of the visitors, or a number indicates the density of visitors in the predetermined range. Especially when there are a large number of visitors within the predetermined range, the smart home device may automatically enter an unconventional working state, such that inconvenience caused by movement and noise to the visitors is prevented, thereby improving overall performance of the smart home device.

Figure 2:
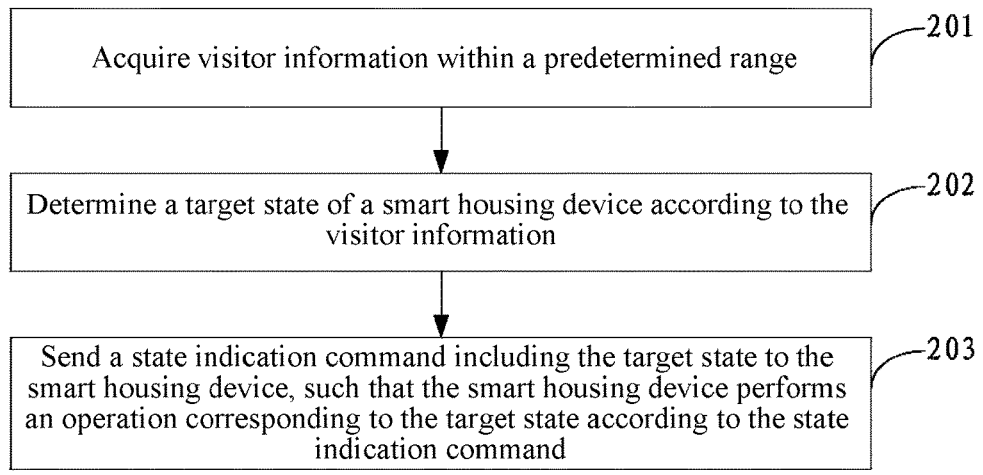
FIG. 2 is a flowchart illustrating another method for controlling a smart home device according to an exemplary embodiment of the present disclosure.

FIG. 2 is a flowchart illustrating another method for controlling a smart home device according to an exemplary embodiment of the present disclosure. The method may be applied in a router, and include the following steps.

In step 201, the router may acquire visitor information within a predetermined range from the router.

In this embodiment, the predetermined range may specifically refer to home, working place or the like. In the predetermined range, a smart router for accessing network is typically deployed, which not only has the traditional routing function, but also may further include an independent operating system and disk, referred to as a router. In the predetermined range, several smart home devices capable of accessing the router may be deployed, for example, smart image pick-up device and the like. The smart home device may be specifically a smart cleaning device capable of moving within the predetermined range, for example, a cleaning robot.

Due to visitor mobility within the predetermined range, according to the embodiments of the present disclosure, the router may acquire the visitor information within the predetermined range, such that a target state of the smart home device is determined according to the visitor information within the predetermined range. In this way, the smart home device may perform an operation corresponding to the target state, to improve the working effectiveness of the smart home device. The router may acquire the visitor information within the predetermined range in any one of the following manners:

First manner: A router acquires a visitor device list according to a predetermined time period, wherein the visitor device list includes one or more device identifiers of one or more visitor devices accessing the router.

Second manner: A router acquires a visitor image according to a predetermined time period, wherein the visitor image is an image picked up by a smart image pick-up device within the predetermined range.

In step 202, the router may determine a target state of the smart home device according to the visitor information.

Corresponding to the different manners for acquiring the visitor information by the router within the predetermined range in step 201, the router in this step may determine the target state of the smart home device in the following corresponding manners:

Corresponding to the first manner in step 201, the router may compare a first identifier quantity of device identifiers included in a visitor device list acquired within a current time period with a second identifier quantity of device identifiers included in a visitor device list acquired within a previous time period; according to a comparison result, if the second identifier quantity is greater than the first identifier quantity, it indicates that a visitor exits the predetermined range, and therefore the target state of the smart home device may be determined as a working state; and if the second identifier quantity is less than the first identifier quantity, it indicates that a visitor enters the predetermined range, and therefore the target state of the smart home device may be determined as a muted state or a stopped state.

Corresponding to the second manner in step 201, the router may compare a first visitor quantity identified in a visitor image acquired within a current time period with a second visitor quantity identified in a visitor image acquired within a previous time period; according to a comparison result, if the second visitor quantity is greater than the first visitor quantity, it indicates that a visitor exits the predetermined range, and therefore the target state of the smart home device may be determined as a working state; and if the second visitor quantity is less than the first visitor quantity, it indicates that a visitor enters the predetermined range, and therefore the target state of the smart home device may be determined as a muted state or a stopped state.

In step 203, a state indication command including the target state is sent to the smart home device, such that the smart home device performs an operation corresponding to the target state according to the state indication command.

Optionally, in the above embodiment, the router may acquire visitor information within a predetermined range, and then send the visitor information to the smart home device according to a predetermined time period, such that the smart home device determines the target state of the smart home device according to the visitor information. The visitor information may include: a visitor device list, which includes device identifiers of visitor devices accessing the router; or a visitor image, which is an image picked up by a smart image pick-up device within the predetermined range.

As seen from the above embodiments, the router may determine a target state of the smart home device according to visitor information within a predetermined range, such that the smart home device performs an operation corresponding to the target state upon receiving a state indication command including the target state. Since the smart home device may flexibly perform different operations according to the actual visit situation, the working effectiveness may be improved. Especially when there are a large number of visitors within the predetermined range, the smart home device may automatically enter an unconventional working state, such that inconvenience caused by movement and noise to the visitors is prevented, thereby improving overall performance of the smart home device.

The embodiments of the present disclosure are described in detail with reference to different application scenarios, wherein assume that the smart home device is a smart cleaning device.

Figure 3A:
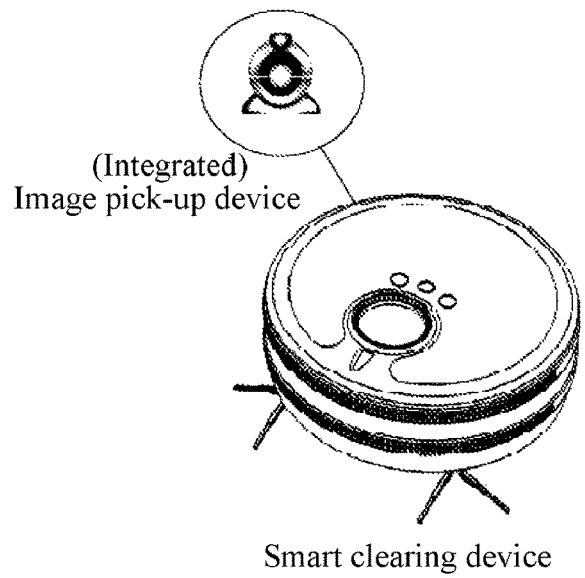
FIG. 3A is a schematic diagram illustrating an application scenario of controlling a smart home device according to an exemplary embodiment of the present disclosure.

FIG. 3A is a schematic diagram illustrating an application scenario of controlling a smart home device according to an exemplary embodiment of the present disclosure.

In the application scenario as illustrated in FIG. 3A, an image pick-up device is integrated into a smart cleaning device. When the smart cleaning device moves within a predetermined range, the smart image pick-up device may pick up a visitor image, and changes of a visitor quantity may be identified in the visitor image, such that a target state of the smart cleaning device is determined as a working state or a muted state based on the changes.

Figure 3B:
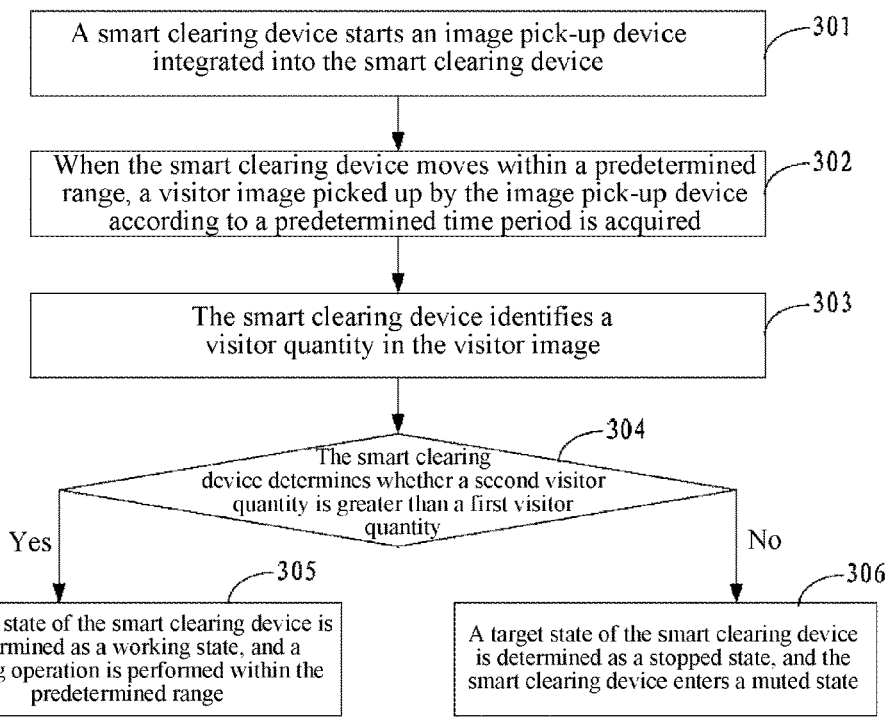
FIG. 3B is a flowchart illustrating a method for controlling a smart home device with reference to FIG. 3A.

FIG. 3B is a flowchart illustrating a method for controlling a smart home device with reference to FIG. 3A. The method includes the following steps.

In step 301, a smart cleaning device starts an image pick-up device integrated therein.

In step 302, when the smart cleaning device moves within the predetermined range, a visitor image picked up by the image pick-up device is acquired according to the predetermined time period.

In this embodiment, when the smart cleaning device controls an image pick-up device to pick up a visitor image, to save the power energy of the smart cleaning device, the image pick-up device may pick up images according to a predetermined time period. For example, the time period may be 5 minutes. During image pick-up, the image pick-up device may enter a dormant state.

In step 303, the smart cleaning device identifies a visitor quantity in the visitor image.

In this embodiment, the smart cleaning device may have a calculation function, and may identify the visitor quantity in a visitor image by using any image identification algorithm in the related technologies. The specific identification process is not described herein any further.

In step 304, the smart cleaning device determines whether a second visitor quantity is greater than a first visitor quantity; if the second visitor quantity is greater than the first visitor quantity, step 305 is performed; and otherwise, step 306 is performed.

With respect to two neighboring time periods, for example, a current time period and a previous time period of the current time period, assume that in step 303, a visitor quantity identified in a visitor image acquired within the current time period is referred to as a first visitor quantity and a visitor quantity identified in a visitor image acquired within the previous time period is referred to as a second visitor quantity, the smart cleaning device may compare the second visitor quantity with the first visitor quantity. If the second visitor quantity is greater than the first visitor quantity, it indicates that as compared with the previous time period, within the current time period, a visitor exits the predetermined range. If the second visitor quantity is less than the first visitor quantity, it indicates that as compared with the previous time period, within the current time period, a visitor enters the predetermined range.

In step 305, a target state of the smart cleaning device is determined as a working state, a cleaning operation is performed within the predetermined range, and the current process ends.

In step 306, a target state of the smart cleaning device is determined as a stopped state, the smart cleaning device enters a muted state, and the current process ends.

As seen from the above embodiment, the smart cleaning device may acquire a visitor image within a predetermined range by using an image pick-up device integrated into the smart cleaning device, determine a target state according to the visitor image, and perform an operation corresponding to the target state. Since the smart cleaning device may flexibly perform different operations according to the actual visit situation, the working effectiveness may be improved. Especially when there are a large number of visitors within the predetermined range, the smart cleaning device may automatically enter an unconventional working state, such that inconvenience caused by movement and noise to the visitors prevented, thereby improving overall performance of the smart cleaning device. In addition, the actual visit situation may be acquired quickly in real time by picking up visitor images by the image pick-up device integrated into the smart cleaning device, thereby to accurately determine the target state of the smart cleaning device.

Figure 4A:
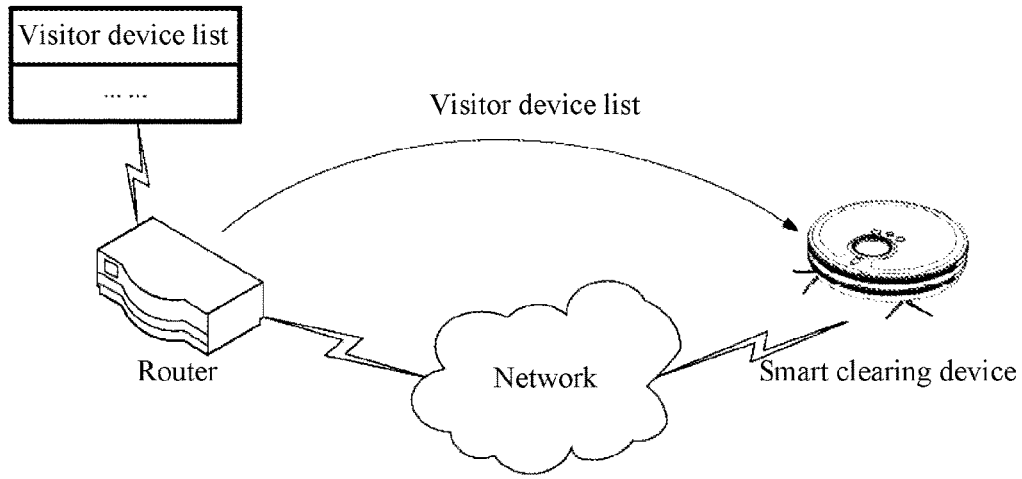
FIG. 4A is a schematic diagram illustrating another application scenario of controlling a smart home device according to an exemplary embodiment of the present disclosure.

FIG. 4A is a schematic diagram illustrating another application scenario of controlling a smart home device according to an exemplary embodiment of the present disclosure.

In the application scenario as illustrated in FIG. 4A, upon accessing a router, a smart cleaning device establishes a Wireless Fidelity (WiFi) communication connection with the router. The router acts as a network access device within a predetermined range, and any device to enter the predetermined range and access the public network needs to firstly access the router. Therefore, the router may determine, according to a visitor device list maintained on the router, devices currently accessing the public network. The visitor device list may specifically include device identifiers of the devices currently accessing the public network. For example, the device identifier may be a media access control (MAC) address of a device. The router may send the visitor device list to the smart cleaning device via the established communication connection, such that the smart cleaning device determines changes of the identifier quantity in the visitor device list. In this way, a target state of the smart cleaning device is determined as a working state or a stopped state.

Figure 4B:
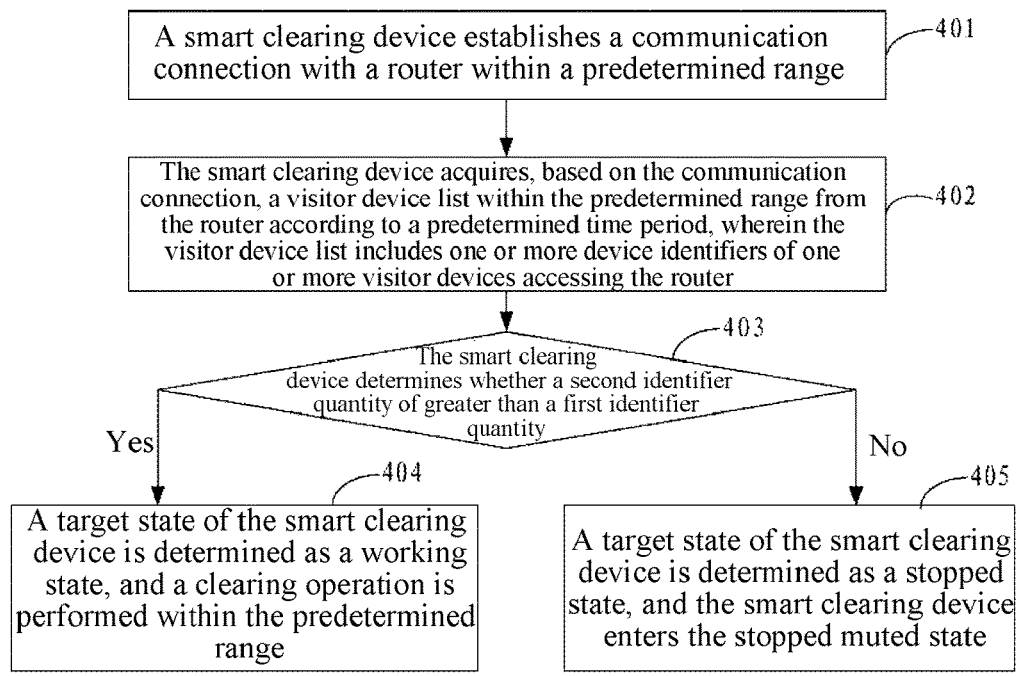
FIG. 4B is a flowchart illustrating a method for controlling a smart home device with reference to FIG. 4A.

FIG. 4B is a flowchart illustrating a method for controlling a smart home device with reference to FIG. 4A. The method includes the following steps.

In step 401, a smart cleaning device establishes a communication connection with a router within a predetermined range.

In step 402, the smart cleaning device acquires, based on the communication connection, a visitor device list within the predetermined range from the router according to a predetermined time period, wherein the visitor device list includes one or more device identifiers of one or more visitor devices accessing the router.

In this embodiment, according to changes of devices accessing the public network within a predetermined range, a router maintains in real time device identifiers in a visitor device list, and the smart cleaning device does not need to acquire the visitor device list but to acquire the visitor device list from the router according to a predetermined time period based on the general changes of visits of the visitors. For example, the predetermined time period may be 5 minutes or any other time period customized by a user via a terminal connected with the router via a network connection.

In step 403, the smart cleaning device determines whether a second identifier quantity is greater than a first identifier quantity. If the second identifier quantity is greater than the first identifier quantity, step 404 is performed; and otherwise, step 405 is performed.

With respect to two neighboring time periods, for example, a current time period and a previous time period of the current time period, assume that an identifier quantity determined by the smart cleaning device in a visitor device list acquired within the current time period is referred to as a first identifier quantity and an identifier quantity determined by the smart cleaning device in a visitor device list acquired within the previous time period is referred to as a second identifier quantity, the smart cleaning device may compare the second identifier quantity with the first identifier quantity. If the second identifier quantity is greater than the first identifier quantity, it indicates that as compared with the previous time period, within the current time period, a visitor exits the predetermined range. If the second identifier quantity is less than the first identifier quantity, it indicates that as compared with the previous time period, within the current time period, a visitor enters the predetermined range.

In step 404, a target state of the smart cleaning device is determined as a working state, a cleaning operation is performed within the predetermined range, and the current process ends.

In step 405, a target state of the smart cleaning device is determined as a stopped state, the smart cleaning device enters the stopped state, and the current process ends.

It should be noted that, in another embodiment of the application scenario as illustrated in FIG. 4A, different from the process as illustrated in FIG. 4B, the router may respectively determine a first identifier quantity in a visitor device list acquired within a current time period and a second identifier quantity in a visitor device list acquired within a previous time period, determine a target state of the smart cleaning device according to a comparison result between the first identifier quantity and the second identifier quantity, and finally send a state indication command including the target state to the smart cleaning device, such that the smart cleaning device directly performs an operation corresponding to the target state according to the state indication command, which is not limited in this embodiment.

As seen from the above embodiment, the smart cleaning device may determine a target state according to a visitor device list maintained by a router within a predetermined range, and perform an operation corresponding to the target state. Since the smart cleaning device may flexibly perform different operations according to the actual visit situation, the working effectiveness may be improved. Especially when there are a large number of visitors within the predetermined range, the smart home device may automatically enter an unconventional working state, such that inconvenience caused by movement and noise to the visitors is prevented, thereby improving overall performance of the smart cleaning device. Since the router maintains a visitor device list according to the devices accessing the router, the router may conveniently and quickly determine actual visit situation according to the visitor device list, thereby to accurately determine the target state of the smart home device.

Figure 5A:
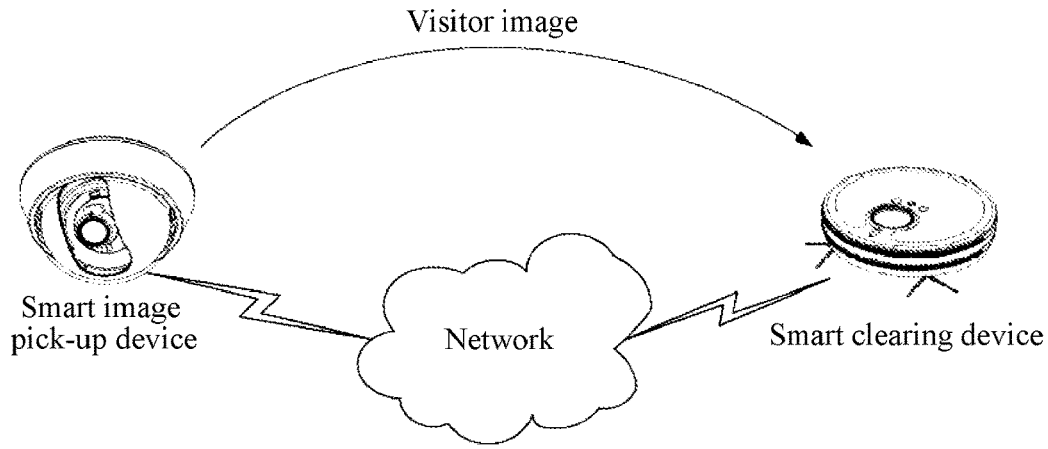
FIG. 5A is a schematic diagram illustrating another application scenario of controlling a smart home device according to an exemplary embodiment of the present disclosure.

FIG. 5A is a schematic diagram illustrating another application scenario of controlling a smart home device according to an exemplary embodiment of the present disclosure.

In the application scenario as illustrated in FIG. 5A, a smart image pick-up device is deployed within a predetermined range, which may acquire a visitor image within the predetermined range by picking up images in a scenario within the predetermined range. A smart cleaning device may establish a communication connection with the smart image pick-up device, for example, a Bluetooth connection or the like. The smart cleaning device may acquire a visitor image from the smart image pick-up device according to a predetermined time period, and identify changes of the visitor quantity in the visitor image, such that a target state of the smart cleaning device is determined as a working state or a stopped state based on the changes.

Figure 5B:
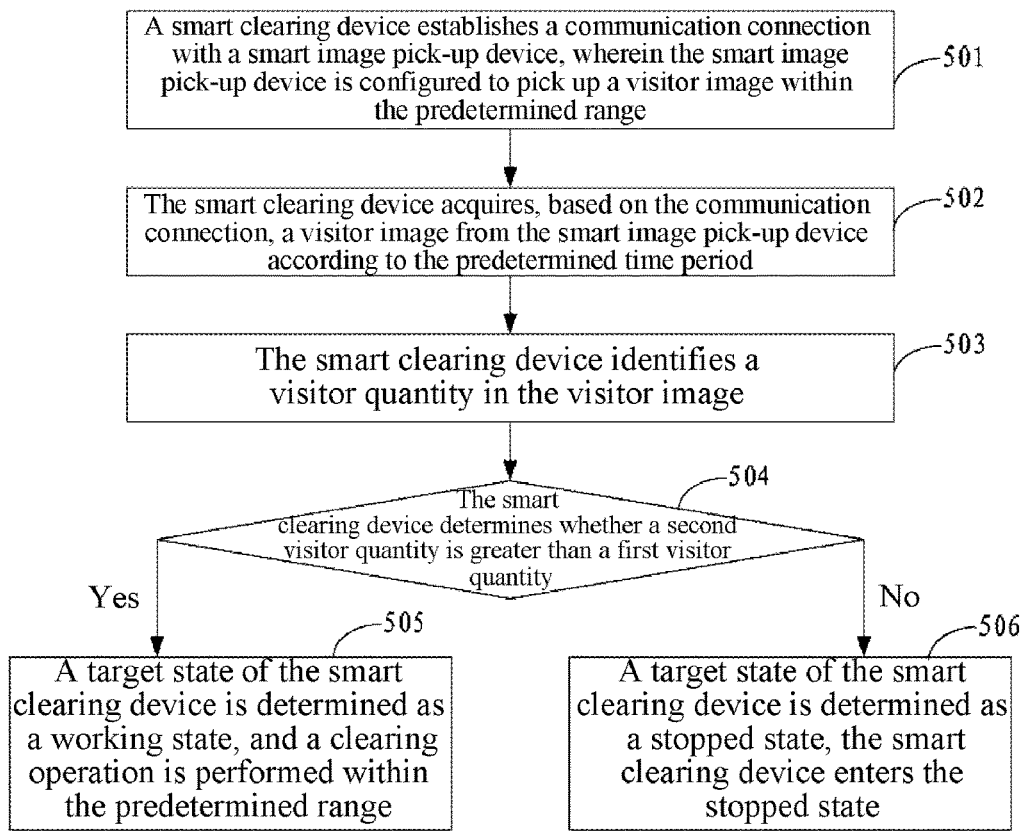
FIG. 5B is a flowchart illustrating a method for controlling a smart home device with reference to FIG. 5A.

FIG. 5B is a flowchart illustrating a method for controlling a smart home device with reference to FIG. 5A. The method includes the following steps.

In step 501, a smart cleaning device establishes a communication connection with a smart image pick-up device, wherein the smart image pick-up device is configured to pick up a visitor image within the predetermined range.

In step 502, the smart cleaning device acquires, based on the communication connection, a visitor image from the smart image pick-up device according to the predetermined time period.

In this embodiment, to save the power energy of the smart cleaning device, the smart cleaning device may acquire a visitor image from a smart image pick-up device according to a predetermined time period. For example, the time period may be 5 minutes.

In step 503, the smart cleaning device identifies a visitor quantity in the visitor image.

In this embodiment, the smart cleaning device may have a calculation function, and may identify the visitor quantity in a visitor image by using any image identification algorithm in the related technologies. The specific identification process is not described herein any further.

In step 504, the smart cleaning device determines whether a second visitor quantity is greater than a first visitor quantity; if the second visitor quantity is greater than the first visitor quantity, step 505 is performed; and otherwise, step 506 is performed.

With respect to two neighboring time periods, for example, a current time period and a previous time period of the current time period, assume that in step 503, a visitor quantity identified in a visitor image acquired within the current time period is referred to as a first visitor quantity and a visitor quantity identified in a visitor image acquired within the previous time period is referred to as a second visitor quantity, the smart cleaning device may compare the second visitor quantity with the first visitor quantity. If the second visitor quantity is greater than the first visitor quantity, it indicates that as compared with the previous time period, within the current time period, a visitor exits the predetermined range. If the second visitor quantity is less than the first visitor quantity, it indicates that as compared with the previous time period, within the current time period, a visitor enters the predetermined range.

In step 505, a target state of the smart cleaning device is determined as a working state, a cleaning operation is performed within the predetermined range, and the current process ends.

In step 506, a target state of the smart cleaning device is determined as a stopped state, the smart cleaning device enters the stopped state, and the current process ends.

It should be noted that, in another embodiment of the application scenario as illustrated in FIG. 5A, different from the process as illustrated in FIG. 5B, when a smart image pick-up device has a calculation function, the smart image pick-up device may also identify the visitor quantity in a visitor image by using any image identification algorithm in the related technologies, determine a target state of a smart cleaning device according to a comparison result between a first visitor quantity within a current time period and a second visitor quantity within a previous time period, and then send a state indication command including the target state to the smart cleaning device, such that the smart cleaning device directly performs an operation corresponding to the target state according to the state indication command, which is not limited in this embodiment.

As seen from the above embodiment, the smart cleaning device may determine a target state according to a visitor image picked up by a smart image pick-up device within a predetermined range, and perform an operation corresponding to the target state. Since the smart cleaning device may flexibly perform different operations according to the actual visit situation, the working effectiveness may be improved. Especially when there are a large number of visitors within the predetermined range, the smart home device may automatically enter an unconventional working state, such that inconvenience caused by movement and noise to the visitors is prevented, thereby improving overall performance of the smart cleaning device.

Figure 6A:
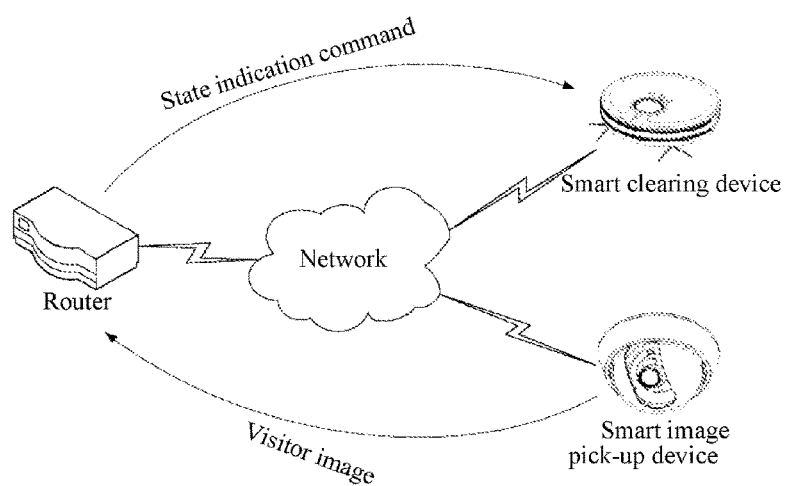
FIG. 6A is a schematic diagram illustrating another application scenario of controlling a smart home device according to an exemplary embodiment of the present disclosure.

FIG. 6A is a schematic diagram illustrating another application scenario of controlling a smart home device according to an exemplary embodiment of the present disclosure.

In the application scenario as illustrated in FIG. 6A, a router acts as a network access device within a predetermined range, and a smart cleaning device and a smart image pick-up device may respectively access the router, and establish a WiFi communication connection with the router. The smart image pick-up device may pick up images in a scenario within the predetermined range, to acquire a visitor image within the predetermined range; the smart image pick-up device may send, according to a predetermined time period, the visitor image to the router via the established WiFi communication connection. The router identifies changes of the visitor quantity in the visitor image, determines a target state of the smart cleaning device based on the changes, and thus sends a state indication command including the target state to the smart cleaning device, such that the smart cleaning device determines to enter a working state or a stopped state according to the state indication command.

Figure 6B:
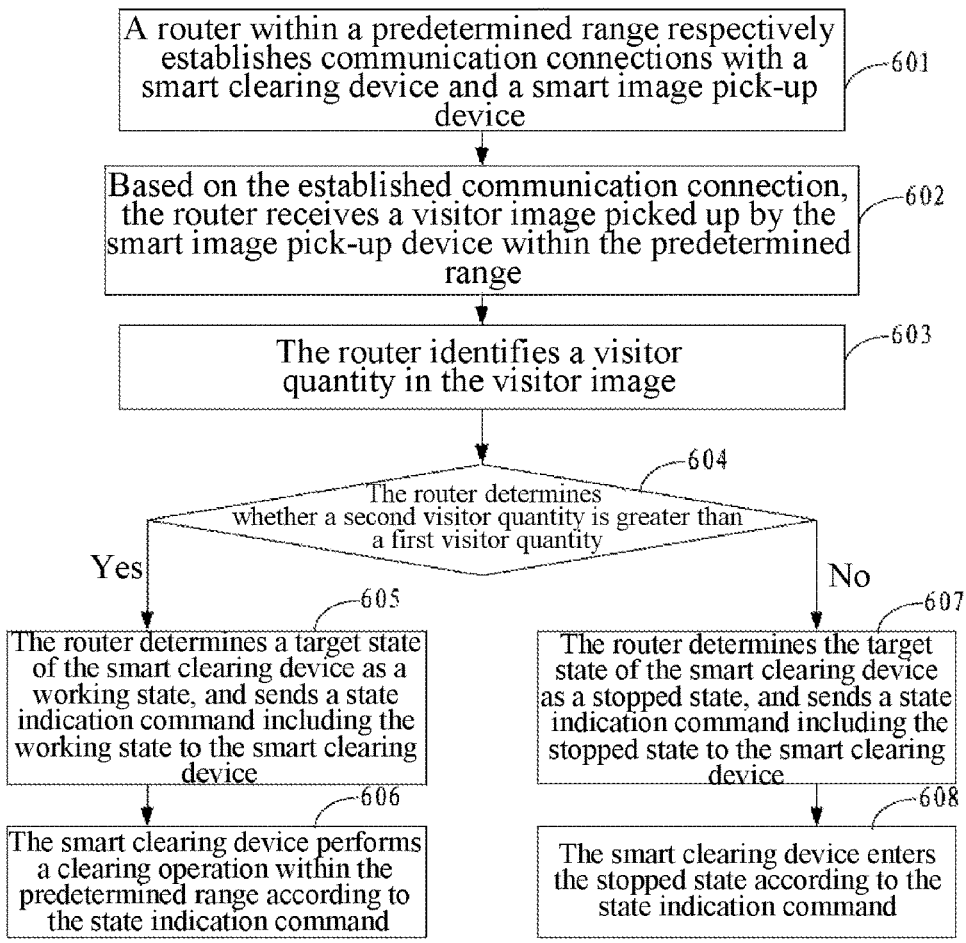
FIG. 6B is a flowchart illustrating a method for controlling a smart home device with reference to FIG. 6A.

FIG. 6B is a flowchart illustrating a method for controlling a smart home device with reference to FIG. 6A. The method includes the following steps.

In step 601, a router within a predetermined range respectively establishes communication connections with a smart cleaning device and a smart image pick-up device.

In step 602, based on the established communication connection, the router receives a visitor image picked up by the smart image pick-up device within the predetermined range.

In step 603, the router identifies a visitor quantity in the visitor image.

In this embodiment, the router may have a calculation function, and may identify the visitor quantity in a visitor image by using any image identification algorithm in the related technologies. The specific identification process is not described herein any further.

In step 604, the router determines whether a second visitor quantity is greater than a first visitor quantity; if the second visitor quantity is greater than the first visitor quantity, step 605 is performed; and otherwise, step 607 is performed.

With respect to two neighboring time periods, for example, a current time period and a previous time period of the current time period, assume that a visitor quantity identified by the router in a visitor image acquired within the current time period is referred to as a first visitor quantity and a visitor quantity identified by the router in a visitor image acquired within the previous time period is referred to as a second visitor quantity, the router may compare the second visitor quantity with the first visitor quantity. If the second visitor quantity is greater than the first visitor quantity, it indicates that as compared with the previous time period, within the current time period, a visitor exits the predetermined range. If the second visitor quantity is less than the first visitor quantity, it indicates that as compared with the previous time period, within the current time period, a visitor enters the predetermined range.

In step 605, the router determines a target state of the smart cleaning device as a working state, and sends a state indication command including the working state to the smart cleaning device.

In step 606, the smart cleaning device performs a cleaning operation within the predetermined range according to the state indication command, and the current process ends.

In step 607, the router determines the target state of the smart cleaning device as a stopped state, and sends a state indication command including the stopped state to the smart cleaning device.

In step 608, the smart cleaning device enters the stopped state according to the state indication command, and the current process ends.

It should be noted that, in another embodiment of the application scenario as illustrated in FIG. 6A, different from the process as illustrated in FIG. 6B, the smart image pick-up device may have a calculation function, the smart image pick-up device may identify the visitor quantity in a visitor image by using any image identification algorithm in the related technologies, determine a target state of a smart cleaning device according to a comparison result between a first visitor quantity within a current time period and a second visitor quantity within a previous time period, and then send the target state to a router. Alternatively or additionally, the smart cleaning device may have a calculation function, the router may also directly forward a visitor image sent by the smart image pick-up device to the smart cleaning device, such that the smart cleaning device identifies the visitor quantity in the visitor image by using any image identification algorithm in the related technologies, and determines the target state of the smart cleaning device according to the comparison result between the first visitor quantity within the current time period and the second visitor quantity within the previous time period, which is not limited in this embodiment.

As seen from the above embodiment, smart devices within a predetermined range are uniformly managed via a router, a target state of a smart cleaning device is determined according to a visitor image picked up by a smart image pick-up device, and an operation corresponding to the target state is performed. Since the smart cleaning device may flexibly perform different operations according to the actual visit situation, the working effectiveness may be improved. Especially when there are a large number of visitors within the predetermined range, the smart home device may automatically enter an unconventional working state, such that inconvenience caused by movement and noise to the visitors is prevented, thereby improving overall performance of the smart cleaning device.

Corresponding to the embodiments illustrating the method for controlling a smart home device, the present disclosure further provides embodiments illustrating an apparatus for controlling a smart home device and a smart home device and a router in which the apparatus is applied.

Figure 7:
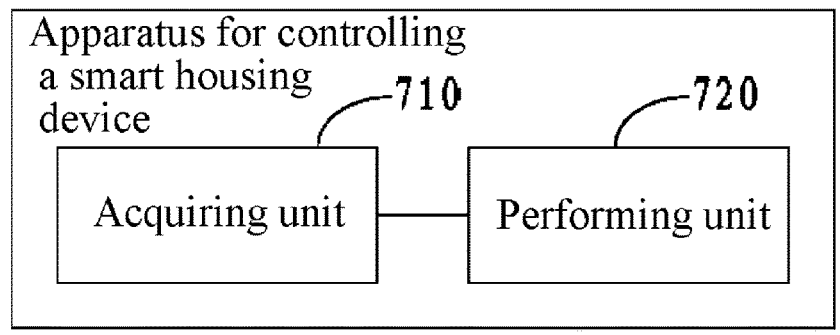
FIG. 7 is a block diagram illustrating an apparatus for controlling a smart home device according to an exemplary embodiment of the present disclosure.

FIG. 7 is a block diagram illustrating an apparatus for controlling a smart home device according to an exemplary embodiment of the present disclosure. As illustrated in FIG. 7, the apparatus includes: an acquiring unit 710 and a performing unit 720.

The acquiring unit 710 is configured to acquire a target state of the smart home device, wherein the target state is a state determined according to visitor information within a predetermined range.

The performing unit 720 is configured to perform an operation corresponding to the target state.

In the above embodiment, the apparatus may acquire a target state determined according to visitor information within a predetermined range, and perform an operation corresponding to the target state. Since the smart home device may flexibly perform different operations according to the actual visit situation, the working effectiveness may be improved. Especially when there are a large number of visitors within the predetermined range, the smart home device may automatically enter an unconventional working state, such that inconvenience caused by movement and noise to the visitors is prevented, thereby improving overall performance of the smart home device.

Figure 8A:
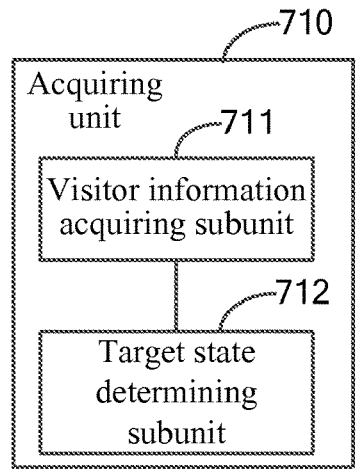
FIG. 8A is a block diagram illustrating another apparatus for controlling a smart home device according to an exemplary embodiment of the present disclosure.

FIG. 8A is a block diagram illustrating another apparatus for controlling a smart home device according to an exemplary embodiment of the present disclosure. This embodiment is based on the embodiment as illustrated in FIG. 7. As illustrated in FIG. 8A, the acquiring unit 710 may include: a visitor information acquiring subunit 711 and a target state determining subunit 712.

The visitor information acquiring subunit 711 is configured to acquire the visitor information within the predetermined range.

The target state determining subunit 712 is configured to determine the target state of the smart home device according to the visitor information.

In the above embodiment, the apparatus may actively acquire visitor information within a predetermined range and thus determine a target state of a smart home device. Therefore, the apparatus may fully use arrangement and networking of devices within the predetermined range, and flexibly acquire the target state in different manners.

Figure 8B:
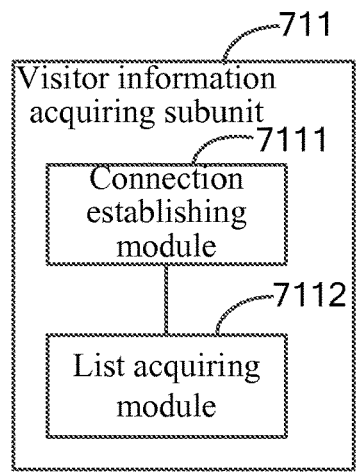
FIG. 8B is a block diagram illustrating another apparatus for controlling a smart home device according to an exemplary embodiment of the present disclosure.

FIG. 8B is a block diagram illustrating another apparatus for controlling a smart home device according to an exemplary embodiment of the present disclosure. This embodiment is based on the embodiment as illustrated in FIG. 8A. As illustrated in FIG. 8B, the visitor information acquiring subunit 711 may include: a connection establishing module 7111 and a list acquiring module 7112.

The connection establishing module 7111 is configured to establish a communication connection with a router within the predetermined range.

The list acquiring module 7112 is configured to, based on the communication connection, acquire a visitor device list within the predetermined range from the router according to a predetermined time period, wherein the visitor device list includes one or more device identifiers of one or more visitor devices accessing the router.

Figure 8C:
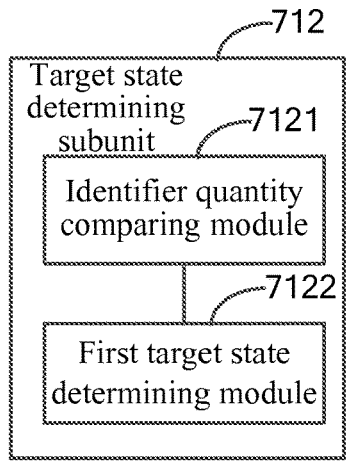
FIG. 8C is a block diagram illustrating another apparatus for controlling a smart home device according to an exemplary embodiment of the present disclosure.

FIG. 8C is a block diagram illustrating another apparatus for controlling a smart home device according to an exemplary embodiment of the present disclosure. This embodiment is based on the embodiment as illustrated in FIG. 8B. As illustrated in FIG. 8C, the target state determining subunit 712 may include: an identifier quantity comparing module 7121 and a first target state determining module 7122.

The identifier quantity comparing module 7121 is configured to compare a first identifier quantity of device identifiers included in a visitor device list acquired within a current time period with a second identifier quantity of device identifiers included in a visitor device list acquired within a previous time period.

The first target state determining module 7122 is configured to: according to a comparison result, if the second identifier quantity is greater than the first identifier quantity, determine that the target state of the smart home device is a working state; and if the second identifier quantity is less than the first identifier quantity, determine that the target state of the smart home device is a muted state or a stopped state.

In the above embodiment, when a router is deployed within a predetermined range, the apparatus may judge the actual visit situation according to changes of the device identifier quantity in a visitor device list maintained on the router, so as to determine a target state of the smart home device. Since it is a common function for the router to maintain a visitor device list according to the devices accessing the router, actual visit situation may be conveniently and quickly determined according to the visitor device list, thereby to accurately determine the target state of the smart home device.

Figure 8D:
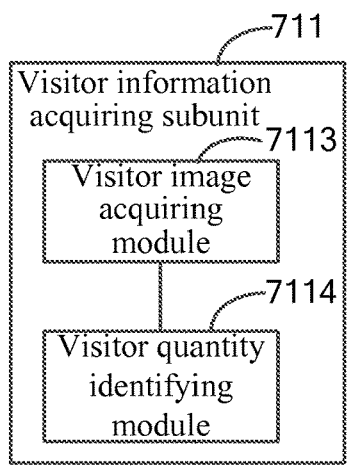
FIG. 8D is a block diagram illustrating another apparatus for controlling a smart home device according to an exemplary embodiment of the present disclosure.

FIG. 8D is a block diagram illustrating another apparatus for controlling a smart home device according to an exemplary embodiment of the present disclosure. This embodiment is based on the embodiment as illustrated in FIG. 8A. As illustrated in FIG. 8D, the visitor information acquiring subunit 711 may include: a visitor image acquiring module 7113 and a visitor quantity identifying module 7114.

The visitor image acquiring module 7113 is configured to acquire a visitor image within the predetermined range according to a predetermined time period.

The visitor quantity identifying module 7114 is configured to identify a visitor quantity in the visitor image.

Figure 8E:
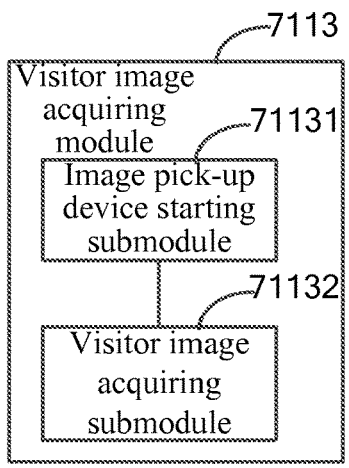
FIG. 8E is a block diagram illustrating another apparatus for controlling a smart home device according to an exemplary embodiment of the present disclosure.

FIG. 8E is a block diagram illustrating another apparatus for controlling a smart home device according to an exemplary embodiment of the present disclosure. This embodiment is based on the embodiment as illustrated in FIG. 8D. As illustrated in FIG. 8E, the visitor image acquiring module 7113 may include: an image pick-up device starting submodule 71131 and a visitor image acquiring submodule 71132.

The image pick-up device starting submodule 71131 is configured to start an image pick-up device integrated into the smart home device.

The visitor image acquiring submodule 71132 is configured to acquire a visitor image picked up by the image pick-up device according to the predetermined time period when the smart home device moves within the predetermined range.

Figure 8F:
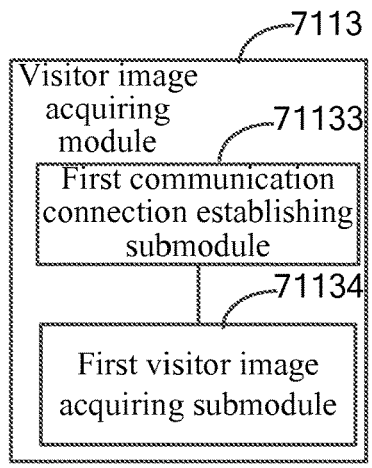
FIG. 8F is a block diagram illustrating another apparatus for controlling a smart home device according to an exemplary embodiment of the present disclosure.

FIG. 8F is a block diagram illustrating another apparatus for controlling a smart home device according to an exemplary embodiment of the present disclosure. This embodiment is based on the embodiment as illustrated in FIG. 8D. As illustrated in FIG. 8F, the visitor image acquiring module 7113 may include: a first communication connection establishing submodule 71133 and a first visitor image acquiring submodule 71134.

The first communication connection establishing submodule 71133 is configured to establish a communication connection with a smart image pick-up device, wherein the smart image pick-up device is configured to pick up a visitor image within the predetermined range.

The first visitor image acquiring submodule 71134 is configured to, based on the communication connection, acquire the visitor image from the smart image pick-up device according to the predetermined time period.

Figure 8G:
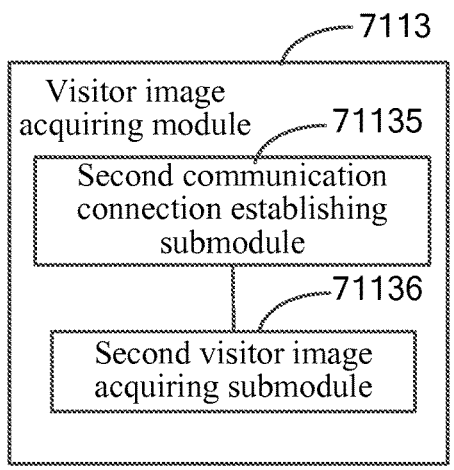
FIG. 8G is a block diagram illustrating another apparatus for controlling a smart home device according to an exemplary embodiment of the present disclosure.

FIG. 8G is a block diagram illustrating another apparatus for controlling a smart home device according to an exemplary embodiment of the present disclosure. This embodiment is based on the embodiment as illustrated in FIG. 8D. As illustrated in FIG. 8G, the visitor image acquiring module 7113 may include: a second communication connection establishing submodule 71135 and a second visitor image acquiring submodule 71136.

The second communication connection establishing submodule 71135 is configured to establish a communication connection with a router within the predetermined range, wherein the router is configured to receive a visitor image picked up by a smart image pick-up device within the predetermined range.

The second visitor image acquiring submodule 71136 is configured to, based on the communication connection, receive the visitor image forwarded by the router according to the predetermined time period.

Figure 8H:
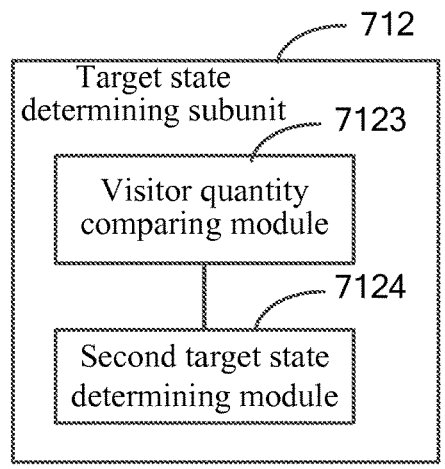
FIG. 8H is a block diagram illustrating another apparatus for controlling a smart home device according to an exemplary embodiment of the present disclosure.

FIG. 8H is a block diagram illustrating another apparatus for controlling a smart home device according to an exemplary embodiment of the present disclosure. This embodiment is based on the embodiment as illustrated in FIG. 8B. As illustrated in FIG. 8H, the target state determining subunit 712 may include: a visitor quantity comparing module 7123 and a second target state determining module 7124.

The visitor quantity comparing module 7123 is configured to compare a first visitor quantity identified in a visitor image acquired within a current time period with a second visitor quantity identified in a visitor image acquired within a previous time period.

The second target state determining module 7124 is configured to: according to a comparison result, if the second visitor quantity is greater than the first visitor quantity, determine that the target state of the smart home device is a working state; and if the second visitor quantity is less than the first visitor quantity, determine that the target state of the smart home device is a muted state or a stopped state.

In the above embodiment, the apparatus may acquire a visitor image by using an image pick-up function integrated into the apparatus, or may acquire a visitor image picked up by a smart image pick-up device via a direct connection to the smart image pick-up device, or may acquire a visitor image, picked up by the smart image pick-up device, which is forwarded by a router when all the smart devices within a predetermined range are connected to the router. Therefore, the visitor image may be acquired in a plurality of manners, and thus different smart networking environments may be accommodated.

Figure 8I:
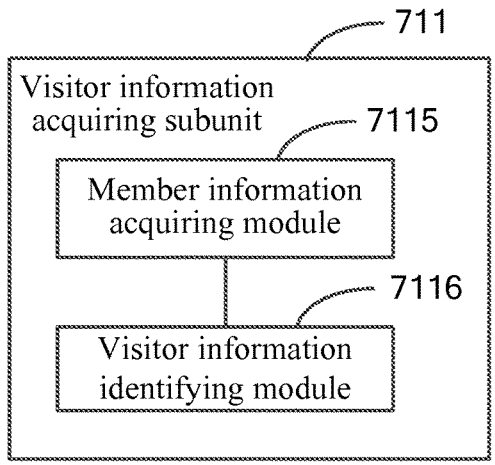
FIG. 8I is a block diagram illustrating another apparatus for controlling a smart home device according to an exemplary embodiment of the present disclosure.

FIG. 8I is a block diagram illustrating another apparatus for controlling a smart home device according to an exemplary embodiment of the present disclosure. This embodiment is based on the embodiment as illustrated in FIG. 8A. As illustrated in FIG. 8I, the visitor information acquiring subunit 711 may include: a member information acquiring module 7115 and a visitor information identifying module 7116.

The member information acquiring module 7115 is configured to acquire member information within the predetermined range.

The visitor information identifying module 7116 is configured to identify the visitor information from the member information.

Figure 8J:
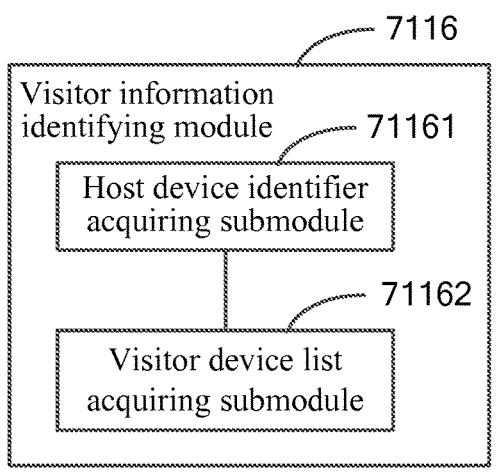
FIG. 8J is a block diagram illustrating another apparatus for controlling a smart home device according to an exemplary embodiment of the present disclosure.

FIG. 8J is a block diagram illustrating another apparatus for controlling a smart home device according to an exemplary embodiment of the present disclosure. This embodiment is based on the embodiment as illustrated in FIG. 8I. As illustrated in FIG. 8J, the visitor information identifying module 7116 may include: a host device identifier acquiring submodule 71161 and a visitor device list acquiring submodule 71162.

The host device identifier acquiring submodule 71161 is configured to acquire a prestored host device identifier of a host device when the member information is a member device list maintained by a router.

The visitor device list acquiring submodule 71162 is configured to delete the host device identifier from the member device list, and acquire a visitor device list formed of one or more visitor device identifiers of one or more visitor devices.

Figure 8K:
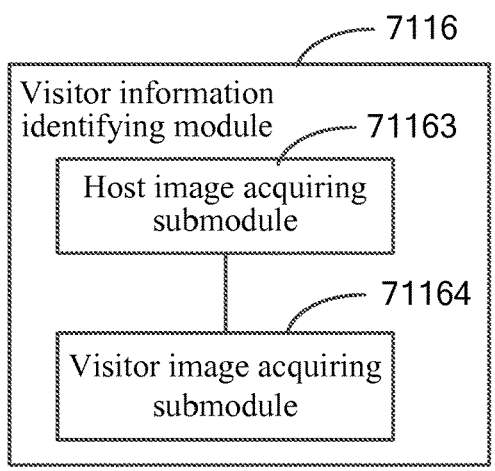
FIG. 8K is a block diagram illustrating another apparatus for controlling a smart home device according to an exemplary embodiment of the present disclosure.

FIG. 8K is a block diagram illustrating another apparatus for controlling a smart home device according to an exemplary embodiment of the present disclosure. This embodiment is based on the embodiment as illustrated in FIG. 8I. As illustrated in FIG. 8K, the visitor information identifying module 7116 may include: a host image acquiring submodule 71163 and a visitor image acquiring submodule 71164.

The host image acquiring submodule 71163 is configured to acquire a prestored host image when the member information is a member image picked up within the predetermined range.

The visitor image acquiring submodule 71164 is configured to remove the host image from the member image by using a face recognition algorithm, and acquire a visitor image.

In the above embodiment, the smart home device may identify visitor information from member information within a predetermined range, and may distinguish host information from visitor information in the member information. In this way, a target state may be accurately determined according to the visitor information.

Figure 9A:
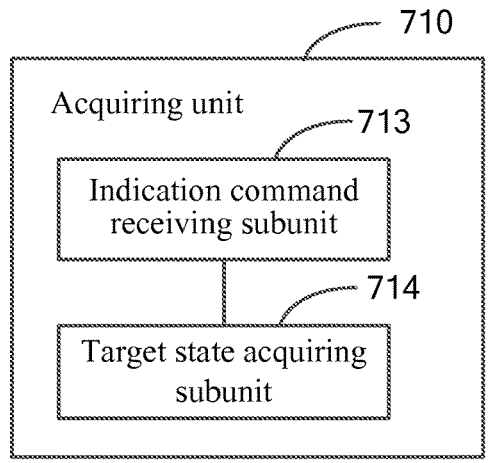
FIG. 9A is a block diagram illustrating another apparatus for controlling a smart home device according to an exemplary embodiment of the present disclosure.

FIG. 9A is a block diagram illustrating another apparatus for controlling a smart home device according to an exemplary embodiment of the present disclosure. This embodiment is based on the embodiment as illustrated in FIG. 7. As illustrated in FIG. 9A, the acquiring unit 710 may include: an indication command receiving subunit 713 and a target state acquiring subunit 714.

The indication command receiving subunit 713 is configured to receive a state indication command.

The target state acquiring subunit 714 is configured to acquire the target state of the smart home device from the state indication instruction.

Figure 9B:
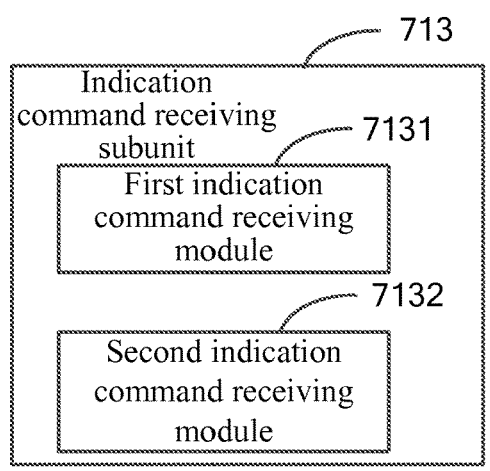
FIG. 9B is a block diagram illustrating another apparatus for controlling a smart home device according to an exemplary embodiment of the present disclosure.

FIG. 9B is a block diagram illustrating another apparatus for controlling a smart home device according to an exemplary embodiment of the present disclosure. This embodiment is based on the embodiment as illustrated in FIG. 9A. As illustrated in FIG. 9B, the indication command receiving subunit 713 may include at least one module. For ease of description, FIG. 9B illustrates the following two modules: a first indication command receiving module 7131 and a second indication command receiving module 7132.

The first indication command receiving module 7131 is configured to receive a state indication command sent by a router, wherein the state indication command includes the target state determined by the router according to a visitor device list, or the target state determined by the router according to a visitor image picked up by a smart image pick-up device.

The second indication command receiving module 7132 is configured to receive a state indication command sent by a smart image pick-up device, wherein the state indication command includes the target state determined by the smart image pick-up device according to a picked up visitor image.

In the above embodiment, the apparatus may actively acquire visitor information within a predetermined range and thus determine a target state of a smart home device. Therefore, smart home device may fully use arrangement and networking of devices within the predetermined range, and flexibly acquire the target state in different manners.

Figure 10A:
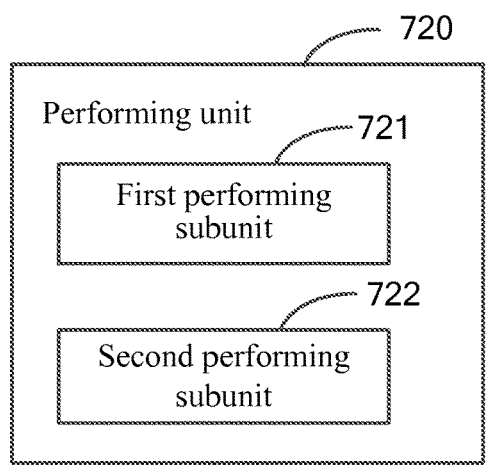
FIG. 10A is a block diagram illustrating another apparatus for controlling a smart home device according to an exemplary embodiment of the present disclosure.

FIG. 10A is a block diagram illustrating another apparatus for controlling a smart home device according to an exemplary embodiment of the present disclosure. This embodiment is based on any of the embodiments as illustrated in FIG. 7 to FIG. 9. When the target state acquired by the acquiring unit 710 is a working state and the operation corresponding to the target state is a cleaning operation, as illustrated in FIG. 10A, the performing unit 720 may include at least one subunit. For ease of description, FIG. 10A illustrates the following two subunits:

a first performing subunit 721, configured to acquire a visitor activity region within the predetermined range, and perform a cleaning operation within the activity region; and a second performing subunit 722, configured to acquire a visitor activity path within the predetermined range, and perform a cleaning operation according to the activity path.

In the above embodiment, when the apparatus performs a cleaning operation in a working state, a targeted cleaning operation may be performed according to a visitor activity region or a visitor activity path within a predetermined range, thereby extending the working manner of the apparatus and further improving working flexibility of the apparatus.

Figure 10B:
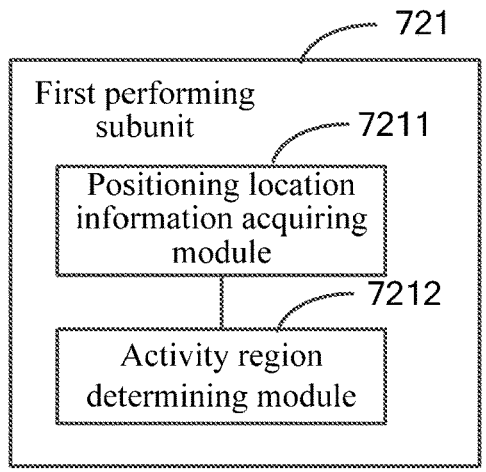
FIG. 10B is a block diagram illustrating another apparatus for controlling a smart home device according to an exemplary embodiment of the present disclosure.

FIG. 10B is a block diagram illustrating another apparatus for controlling a smart home device according to an exemplary embodiment of the present disclosure. This embodiment is based on the embodiment as illustrated in FIG. 10A. As illustrated in FIG. 10B, the first performing subunit 721 may include: a positioning location information acquiring module 7211 and an activity region determining module 7212.

The positioning location information acquiring module 7211 is configured to acquire visitor location information by positioning a visitor-carried device within the predetermined range.

The activity region determining module 7212 is configured to determine a range determined according to the visitor location information as the visitor activity region.

Figure 10C:
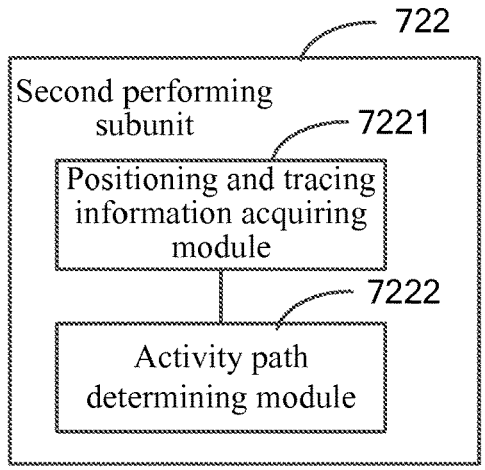
FIG. 10C is a block diagram illustrating another apparatus for controlling a smart home device according to an exemplary embodiment of the present disclosure.

FIG. 10C is a block diagram illustrating another apparatus for controlling a smart home device according to an exemplary embodiment of the present disclosure. This embodiment is based on the embodiment as illustrated in FIG. 10A. As illustrated in FIG. 10C, the second performing subunit 722 may include: a positioning and tracing information acquiring module 7221 and an activity path determining module 7222.

The positioning and tracing information acquiring module 7221 is configured to acquire visitor location change information by positioning and tracing a visitor-carried device within the predetermined range.

The activity path determining module 7222 is configured to determine the visitor activity path according to the location change information.

The embodiments of the apparatus for controlling a smart home device as illustrated in any of FIG. 7 to FIG. 10 may be applied in a smart home device.

Figure 11:
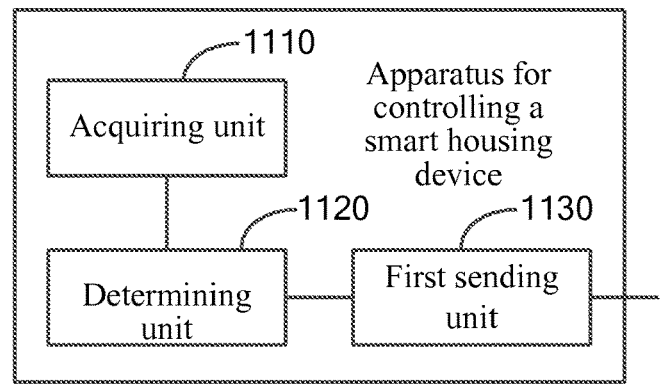
FIG. 11 is a block diagram illustrating another apparatus for controlling a smart home device according to an exemplary embodiment of the present disclosure.

FIG. 11 is a block diagram illustrating another apparatus for controlling a smart home device according to an exemplary embodiment of the present disclosure. As illustrated in FIG. 11, the apparatus includes: an acquiring unit 1110, a determining unit 1120, and a first sending unit 1130.

The acquiring unit 1110 is configured to acquire visitor information within a predetermined range.

The determining unit 1120 is configured to determine a target state of the smart home device according to the visitor information.

The first sending unit 1130 is configured to send a state indication command including the target state to the smart home device, such that the smart home device performs an operation corresponding to the target state according to the state indication command.

Figure 12:
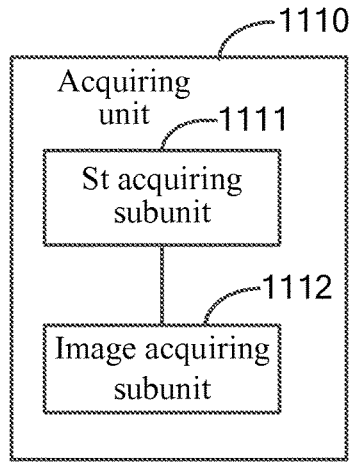
FIG. 12 is a block diagram illustrating another apparatus for controlling a smart home device according to an exemplary embodiment of the present disclosure.

FIG. 12 is a block diagram illustrating another apparatus for controlling a smart home device according to an exemplary embodiment of the present disclosure. This embodiment is based on the embodiment as illustrated in FIG. 11. As illustrated in FIG. 12, the acquiring unit 1110 may include at least one unit. It should be noted that for ease of description, FIG. 12 illustrates the following two units: a list acquiring subunit 1111 and an image acquiring subunit 1112.

The list acquiring subunit 1111 is configured to acquire a visitor device list according to a predetermined time period, wherein the visitor device list is one or more device identifiers of one or more visitor devices accessing the router.

The image acquiring subunit 1112 is configured to acquire a visitor image according to a predetermined time period, wherein the visitor image is an image picked up by a smart image pick-up device within the predetermined range.

Figure 13A:
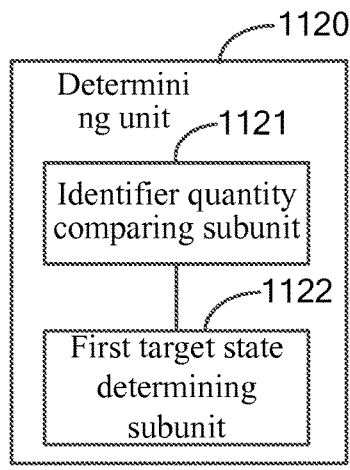
FIG. 13A is a block diagram illustrating another apparatus for controlling a smart home device according to an exemplary embodiment of the present disclosure.

FIG. 13A is a block diagram illustrating another apparatus for controlling a smart home device according to an exemplary embodiment of the present disclosure. This embodiment is based on the embodiment as illustrated in FIG. 12. As illustrated in FIG. 13A, the determining unit 1120 may include: an identifier quantity comparing subunit 1121 and a first target state determining subunit 1122.

The identifier quantity comparing subunit 1121 is configured to compare a first identifier quantity of device identifiers included in a visitor device list acquired by the list acquiring subunit within a current time period with a second identifier quantity of device identifiers included in a visitor device list acquired by the list acquiring subunit within a previous time period.

The first target state determining subunit 1122 is configured to: according to a comparison result, if the second identifier quantity is greater than the first identifier quantity, determine that the target state of the smart home device is a working state; and if the second identifier quantity is less than the first identifier quantity, determine that the target state of the smart home device is a muted state or a stopped state.

Figure 13B:
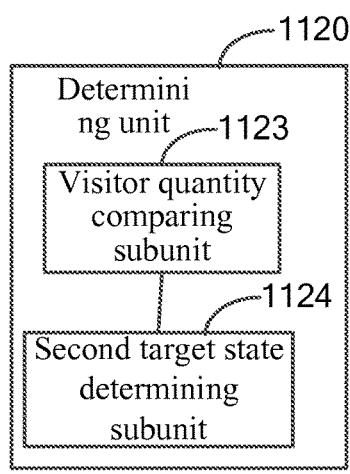
FIG. 13B is a block diagram illustrating another apparatus for controlling a smart home device according to an exemplary embodiment of the present disclosure.

FIG. 13B is a block diagram illustrating another apparatus for controlling a smart home device according to an exemplary embodiment of the present disclosure. This embodiment is based on the embodiment as illustrated in FIG. 12. As illustrated in FIG. 13B, the determining unit 1120 may include: a visitor quantity comparing subunit 1123 and a second target state determining subunit 1124.

The visitor quantity comparing subunit 1123 is configured to compare a first visitor quantity identified in a visitor image acquired by the image acquiring subunit within a current time period with a second visitor quantity identified in a visitor image acquired within a previous time period.

The second target state determining subunit 1124 is configured to: according to a comparison result, if the second visitor quantity is greater than the first visitor quantity, determine that a visitor exits the predetermined range; and if the second visitor quantity is less than the first visitor quantity, determine that a visitor enters the predetermined range.

Figure 14:
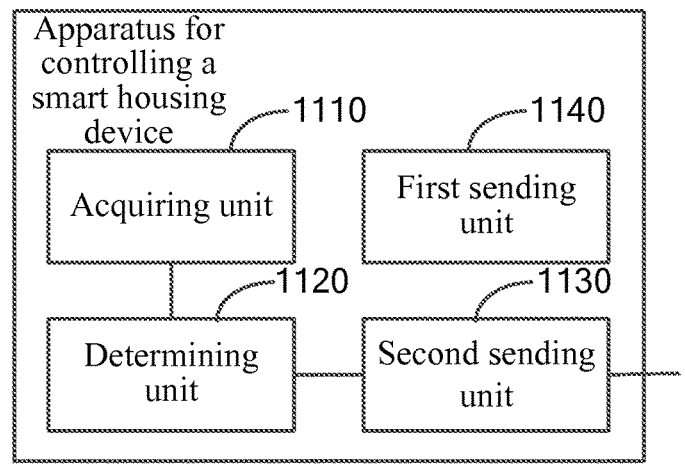
FIG. 14 is a block diagram illustrating another apparatus for controlling a smart home device according to an exemplary embodiment of the present disclosure.

FIG. 14 is a block diagram illustrating another apparatus for controlling a smart home device according to an exemplary embodiment of the present disclosure. This embodiment is based on any of the embodiments as illustrated FIG. 11 to FIG. 13. As illustrated in FIG. 14, the apparatus may further include: a second sending unit 1140.

The second sending unit is configured to send the visitor information to the smart home device according to a predetermined time period, such that the smart home device determines a target state of the smart home device according to the visitor information;

The visitor information may include:

a visitor device list, wherein the visitor device list includes one or more device identifiers of one or more visitor devices accessing the router; and a visitor image, wherein the visitor image is an image picked up by a smart image pick-up device within the predetermined range.

The apparatus for controlling a smart home device as illustrated in any of FIG. 11 to FIG. 14 may be applied in a router.

Specific implementation of functions and effects of various units in the above apparatuses may be referenced to the implementation of the corresponding steps in the methods, which is thus not described herein any further.

With respect to the apparatus embodiments, since the apparatus embodiments are based on the method embodiments, relevant parts may be referenced to the equivalents in the method embodiments. The above-described apparatus embodiments are merely exemplary only. The units used as separate components may be or may not be physically independent of each other. The element illustrated as a unit may be or may not be a physical unit, that is be either located at a position or deployed on a plurality of network units. Part of or all of the modules may be selected as required to implement the technical solutions disclosed in the embodiments of the present disclosure. Persons of ordinary skills in the art may understand and implement the embodiments without any creative effort.

Correspondingly, the present disclosure provides a smart home device, wherein the smart home device includes a processor and a memory for storing instructions executable by the processor. The processor is configured to perform:

acquiring a target state of the smart home device, wherein the target state is a state determined according to visitor information within a predetermined range; and conducting an operation corresponding to the target state.

Correspondingly, the present disclosure provides a router, wherein the router includes a processor and a memory for storing instructions executable by the processor. The processor is configured to perform:

acquiring visitor information within a predetermined range;

determining a target state of the smart home device according to the visitor information; and sending a state indication command including the target state to the smart home device, such that the smart home device performs an operation corresponding to the target state according to the state indication command.

Figure 15:
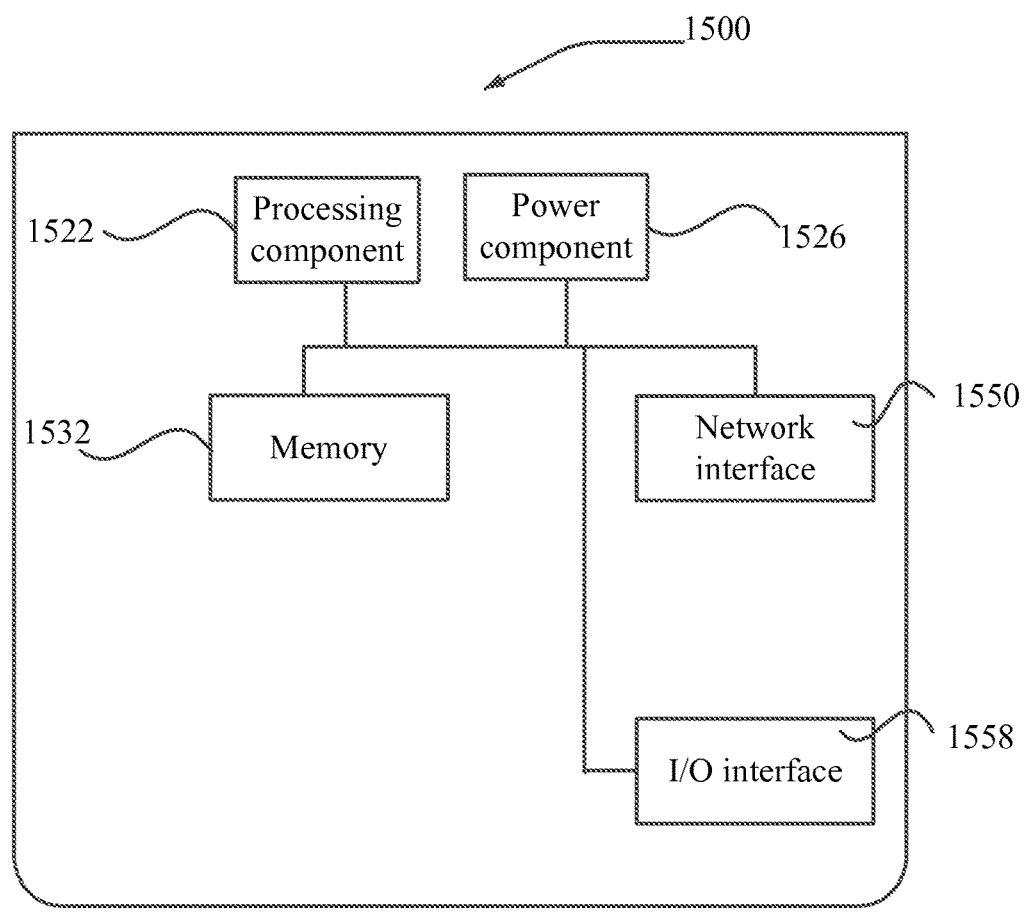
FIG. 15 is a schematic structural diagram illustrating an apparatus for controlling a smart home device according to an exemplary embodiment of the present disclosure.

FIG. 15 is a schematic structural diagram illustrating an apparatus 1500 for controlling a smart home device according to an exemplary embodiment of the present disclosure. For example, the apparatus 1500 may be provided as a router device or a smart home device. Referring to FIG. 15, the apparatus 1500 includes a processing component 1522, which further includes one or more processors and memory resources represented by a memory 1532, configured to store instructions executable by the processing component 1522, for example, applications. The applications stored in the memory 1532 may include one or more than one module each corresponding to a group of instructions. In addition, the processing component 1522 is configured to execute the instructions, to perform the above methods for controlling a smart home device.

The apparatus 1500 may further include: a power component 1526, configured to perform power management in the apparatus 1500; a wired or wireless network interface 1550, configured to connect the apparatus 1500 to the network; and an input/output (I/O) interface 1558. The apparatus 1500 may operate an operating system stored in the memory 1532, for example, Windows Server™, Mac OS X™, Unix™, Linux™, FreeBSD™, or the like.

Other embodiments of the present disclosure will be apparent to those skilled in the art from consideration of the specification and practice disclosed herein. This application is intended to cover any variations, uses, or adaptive variations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

The methods, devices, and modules described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The technical solutions provided in the embodiments of the present disclosure may achieve the following beneficial effects. The smart home device according to the present disclosure may acquire a target state determined according to visitor information within a predetermined range, and perform an operation corresponding to the target state. Since the smart home device may flexibly perform different operations according to the actual visit situation, the working effectiveness may be improved. Especially when there are a large number of visitors within the predetermined range, the smart home device may automatically enter an unconventional working state, such that inconvenience caused by movement and noise to a user is prevented, thereby improving overall performance of the smart home device.

The smart home device according to the present disclosure may actively acquire visitor information within a predetermined range, and determine a target state according to the visitor information, or may acquire a target state determined by another device from a state indication command sent by the device within the predetermined range. Therefore, the smart home device may fully use arrangement and networking of devices within the predetermined range, and flexibly acquire the target state in different manners.

According to the present disclosure, when a router is deployed within a predetermined range, the smart home device may determine the actual visit situation according to changes of the device identifier quantity in a visitor device list maintained on the router, so as to determine a target state of the smart home device. Since it is a common function for the router to maintain a visitor device list according to the devices accessing the router, actual visit situation may be conveniently and quickly determined according to the visitor device list, thereby to accurately determine the target state of the smart home device.

The smart home device according to the present disclosure may also determine the actual visit situation by analyzing changes of the visitor quantity in a visitor image picked up within a predetermined range, so as to determine a target state of the smart home device. Since a plurality of devices within the predetermined range may all be integrated with an image pick-up function, the actual visit situation may be acquired quickly in real time by picking up visitor images by using the image pick-up function, thereby to accurately determine the target state of the smart home device.

The smart home device according to the present disclosure may acquire a visitor image by using an image pick-up function integrated into the smart home device, or may acquire a visitor image picked up by a smart image pick-up device via a direct connection to the smart home device, or may acquire a visitor image, picked up by the smart image pick-up device, which is forwarded by a router when all the smart devices within a predetermined range are connected to the router. Therefore, the visitor image may be acquired in a plurality of manners, and thus different smart networking environments may be accommodated.

The smart home device according to the present disclosure may identify visitor information from member information within a predetermined range, and may distinguish host information from visitor information in the member information. In this way, a target state may be accurately determined according to the visitor information.

According to the present disclosure, when the smart home device performs a cleaning operation in a working state, a targeted cleaning operation may be performed according to a visitor activity region or a visitor activity path within a predetermined range, thereby extending the working manner of the smart home device and further improving working flexibility of the smart home device.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for controlling a smart home device, comprising:
    acquiring a target state of the smart home device, wherein the target state comprises a state at least partially related to visitor information within a predetermined range wherein the smart home device operates in the predetermined range, the visitor information comprises a visitor activity path that is generated by tracing a visitor-carried device within the predetermined range, and the state relates to a subset of the predetermined range that is identified for the smart home device to operate wherein the subset of the predetermined range relates to the visitor information inside the predetermined range; and
    performing an operation corresponding to the target state, wherein the operation is performed by the smart home device in the subset of the predetermined range that is inside the predetermined range;
    wherein acquiring the target state of the smart home device comprises:
        acquiring the visitor information within the predetermined range by:
            establishing a communication connection with a router within the predetermined range;
            acquiring member information that comprises a member device list maintained by the router, within the predetermined range; and
            identifying the visitor information from the member information by acquiring a prestored host device identifier of a host device, deleting the host device identifier from the member device list, and acquiring a visitor device list formed of one or more visitor device identifiers of one or more visitor devices; and
        determining the target state of the smart home device according to the visitor information by:
            comparing a first identifier quantity of device identifiers included in a visitor device list acquired within a current time period with a second identifier quantity of device identifiers included in a visitor device list acquired within a previous time period; and
            according to a comparison result, when the second identifier quantity is greater than the first identifier quantity, determining that the target state of the smart home device is a working state, and when the second identifier quantity is less than the first identifier quantity, determining that the target state of the smart home device is a muted state or a stopped state.

2. The method according to claim 1, wherein acquiring the visitor information within the predetermined range further comprises:
    based on the communication connection, acquiring a visitor device list within the predetermined range from the router according to a predetermined time period, the visitor device list comprising one or more device identifiers of one or more visitor devices accessing the router.

3. The method according to claim 1, wherein acquiring the visitor information within the predetermined range comprises:
    acquiring a visitor image within the predetermined range according to a predetermined time period; and
    identifying a visitor quantity in the visitor image.

4. The method according to claim 3, wherein acquiring the visitor image within the predetermined range according to the predetermined time period comprises:
    starting an image pick-up device integrated into the smart home device; and
    when the smart home device moves within the predetermined range, acquiring a visitor image picked up by the image pick-up device according to the predetermined time period.

5. The method according to claim 3, wherein acquiring the visitor image within the predetermined range according to the predetermined time period comprises:
    establishing a communication connection with a smart image pick-up device configured to pick up a visitor image within the predetermined range; and
    based on the communication connection, acquiring a visitor image from the smart image pick-up device according to the predetermined time period.

6. The method according to claim 3, wherein acquiring the visitor image within the predetermined range according to the predetermined time period comprises:
    establishing a communication connection with a router within the predetermined range, the router being configured to receive a visitor image picked up by a smart image pick-up device within the predetermined range; and
    based on the communication connection, receiving a visitor image forwarded by the router according to the predetermined time period.

7. The method according to claim 3, wherein determining the target state of the smart home device according to the visitor information comprises:
    comparing a first visitor quantity identified in a visitor image acquired within a current time period with a second visitor quantity identified in a visitor image acquired within a previous time period; and
    according to a comparison result, when the second visitor quantity is greater than the first visitor quantity, determining that the target state of the smart home device is a working state, and when the second visitor quantity is less than the first visitor quantity, determining that the target state of the smart home device is a muted state or a stopped state.

8. The method according to claim 1, wherein the acquiring the target state of the smart home device comprises:
receiving a state indication command; and
receiving the target state of the smart home device from the state indication command.

9. The method according to claim 8, wherein receiving the state indication command comprises:
receiving a state indication command sent by a router, the state indication command comprising the target state determined by the router according to a visitor device list, or the target state determined by the router according to a visitor image picked up by a smart image pick-up device; or
receiving a state indication command sent by a smart image pick-up device, the state indication command comprising the target state determined by the smart image pick-up device according to a picked up visitor image.

10. The method according to claim 1, wherein when the target state is a working state and the operation corresponding to the target state is a cleaning operation, the operation corresponding to the target state is performed in at least one of the following manners:
acquiring a visitor activity region within the predetermined range and performing a cleaning operation within the activity region; and
acquiring the visitor activity path within the predetermined range and performing a cleaning operation according to the activity path.

11. The method according to claim 10, wherein acquiring the visitor activity region within the predetermined range comprises:
acquiring visitor location information by positioning the visitor-carried device within the predetermined range; and
determining a range determined according to the visitor location information as the visitor activity region.

12. The method according to claim 10, wherein acquiring the visitor activity path within the predetermined range comprises:
acquiring visitor location change information by positioning and tracing the visitor-carried device within the predetermined range; and
determining the visitor activity path according to the location change information.

13. A method for controlling a smart home device, comprising:
acquiring visitor information within a predetermined range, wherein the smart home device operates in the predetermined range and the visitor information comprises a visitor activity path that is generated by tracing a visitor-carried device within the predetermined range;
determining a target state of the smart home device according to the visitor information, wherein the state relates to a subset of the predetermined range that is identified for the smart home device to operate, and the subset of the predetermined range relates to the visitor information inside the predetermined range; and
sending a state indication command comprising the target state to the smart home device, such that the smart home device performs an operation corresponding to the target state according to the state indication command, wherein the operation is performed by the smart home device in the subset of the predetermined range that is inside the predetermined range;
wherein acquiring the visitor information within the predetermined range comprises:
establishing a communication connection with a router within the predetermined range;
acquiring member information that comprises a member device list maintained by the router, within the predetermined range; and
identifying the visitor information from the member information by acquiring a prestored host device identifier of a host device, deleting the host device identifier from the member device list, and acquiring a visitor device list formed of one or more visitor device identifiers of one or more visitor devices; and
wherein determining the target state of the smart home device according to the visitor information comprises:
comparing a first identifier quantity of device identifiers included in a visitor device list acquired within a current time period with a second identifier quantity of device identifiers included in a visitor device list acquired within a previous time period; and
according to a comparison result, when the second identifier quantity is greater than the first identifier quantity, determining that the target state of the smart home device is a working state, and when the second identifier quantity is less than the first identifier quantity, determining that the target state of the smart home device is a muted state or a stopped state.

14. An apparatus for controlling a smart home device, comprising:
a processor; and a memory for storing instructions executable by the processor; wherein the processor is configured to perform:
acquiring visitor information within a predetermined range, wherein the smart home device operates in the predetermined range and the visitor information comprises a visitor activity path that is generated by tracing a visitor-carried device within the predetermined range;
determining a target state of the smart home device according to the visitor information, wherein the state relates to a subset of the predetermined range that is identified for the smart home device to operate, and the subset of the predetermined range relates to the visitor information inside the predetermined range; and
sending a state indication command comprising the target state to the smart home device, such that the smart home device performs an operation corresponding to the target state according to the state indication command, wherein the operation is performed by the smart home device in the subset of the predetermined range that is inside the predetermined range;
wherein acquiring the visitor information within the predetermined range comprises:
establishing a communication connection with a router within the predetermined range;
acquiring member information that comprises a member device list maintained by the router, within the predetermined range; and
identifying the visitor information from the member information by acquiring a prestored host device identifier of a host device, deleting the host device identifier from the member device list, and acquiring a visitor device list formed of one or more visitor device identifiers of one or more visitor devices; and
wherein determining the target state of the smart home device according to the visitor information comprises:

comparing a first identifier quantity of device identifiers included in a visitor device list acquired within a current time period with a second identifier quantity of device identifiers included in a visitor device list acquired within a previous time period; and according to a comparison result, when the second identifier quantity is greater than the first identifier quantity, determining that the target state of the smart home device is a working state, and when the second identifier quantity is less than the first identifier quantity, determining that the target state of the smart home device is a muted state or a stopped state.

\* \* \* \* \*